United States Patent
Li et al.

(10) Patent No.: US 8,876,406 B2
(45) Date of Patent: Nov. 4, 2014

(54) OPTICAL FIBER CONNECTOR AND ASSEMBLING DEVICE FOR THE SAME

(71) Applicants: Hong Fu Jin Precision Industry (ShenZhen) Co., Ltd., Shenzhen (CN); Hon Hai Precision Industry Co., Ltd., New Taipei (TW)

(72) Inventors: Zhi-Ming Li, Shenzhen (CN); Le-Peng Wei, Shenzhen (CN); Tao Sun, Shenzhen (CN)

(73) Assignees: Hong Fu Jin Precision (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/792,215

(22) Filed: Mar. 11, 2013

(65) Prior Publication Data

US 2013/0266276 A1   Oct. 10, 2013

(30) Foreign Application Priority Data

Apr. 9, 2012   (CN) .......................... 2012 1 0100974

(51) Int. Cl.
  *G02B 6/36*   (2006.01)
  *G02B 6/42*   (2006.01)
  *G02B 6/38*   (2006.01)

(52) U.S. Cl.
  CPC ............... *G02B 6/42* (2013.01); *G02B 6/3898* (2013.01); *G02B 6/3806* (2013.01); *G02B 6/387* (2013.01)
  USPC ........................................... 385/81; 385/136

(58) Field of Classification Search
  CPC .... G02B 6/3806; G02B 6/3835; G02B 6/387; G02B 6/3898
  USPC .......................................... 385/62, 81, 87, 135
  See application file for complete search history.

(56) References Cited

U.S. PATENT DOCUMENTS

| | | | |
|---|---|---|---|
| 6,554,487 B2 * | 4/2003 | Nolan | 385/78 |
| 7,369,738 B2 * | 5/2008 | Larson et al. | 385/134 |
| 7,677,926 B1 * | 3/2010 | Huang | 439/607.38 |
| 8,459,880 B2 * | 6/2013 | Castonguay et al. | 385/78 |
| 2008/0226236 A1 * | 9/2008 | Pepin et al. | 385/81 |

FOREIGN PATENT DOCUMENTS

| | | |
|---|---|---|
| CN | 102955206 A | 3/2013 |
| JP | 2001-249251 A | 9/2001 |
| JP | 2002-72011 A | 3/2002 |

* cited by examiner

*Primary Examiner* — Charlie Peng
(74) *Attorney, Agent, or Firm* — Novak Druce Connolly Bove + Quigg LLP

(57) ABSTRACT

An optical fiber connector includes a fixing module for gripping an optical fiber, an inner housing sleeved on the fixing module; and an outer housing sleeved on the inner housing. The fixing module includes a support member, a fastening member mating with the support member, and a locking member sleeved on the support member. The locking member forms at least one pair of gripping portions at outer surfaces of the locking member. The inner housing defines a pair of sliding grooves in a side wall thereof. The outer housing defines a pair of operating grooves communicating with the pair of sliding grooves correspondingly. The locking member is capable of sliding along the support member to grip or unlock the optical fiber driven by an assembly tool engaging with the pair of gripping portions through the pair of sliding grooves and the pair of operating grooves.

8 Claims, 13 Drawing Sheets

OPTICAL FIBER CONNECTOR AND ASSEMBLING DEVICE FOR THE SAME

CROSS-REFERENCE TO RELATED APPLICATIONS

This application claims all benefits accruing under 35 U.S.C. §119 from China Patent Application No. 201210100974.8, filed on Apr. 9, 2012, in the China Intellectual Property Office, the disclosure of which is incorporated herein by reference. The application is also related to co-pending applications entitled, "FIBER END SURFACE MACHINING DEVICE AND FIBER POSITION STRUCTURE THEREOF" Ser. No. 13/792,218; "FIBER MACHINING DEVICE AND ASSEMBLING METHOD FOR OPTICAL FIBER CONNECTOR" Ser. No. 13/792,219; "OPTICAL FIBER CONNECTOR" Ser. No. 13/792,221; "OPTICAL FIBER CONNECTOR" Ser. No. 13/792,222; "OPTICAL FIBER CONNECTOR" Ser. No. 13/792,223; "OPTICAL FIBER CLAMPING MECHANISM AND OPTICAL FIBER CONNECTOR USING THE SAME" Ser. No. 13/792,229.

BACKGROUND

1. Technical Field

The present disclosure relates to connectors, particularly to an optical fiber connector and an assembling device for the optical fiber connector.

2. Description of the Related Art

Fiber To The Home is widely used in the telecommunications field, and many optical fiber connectors are needed for connecting the optical fiber. An optical fiber connector generally includes an optical ferrule with an optical fiber stub already terminated in the optical ferrule, an optical fiber holder, and a clamp sleeve sleeved on the optical fiber holder to fasten a field optical fiber. To improve the quality of optical coupling and minimize Fresnel losses of the optical fiber connector, an end surface of the field optical fiber may be treated by polishing. However, the end surface of the field optical fiber may be scraped during the assembling process of the field optical fiber and generate a plurality of depressions, cracks, or scratches at the end surface of the optical fiber, which will increase a light loss and affect the efficiency of data transmission of the optical connector.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
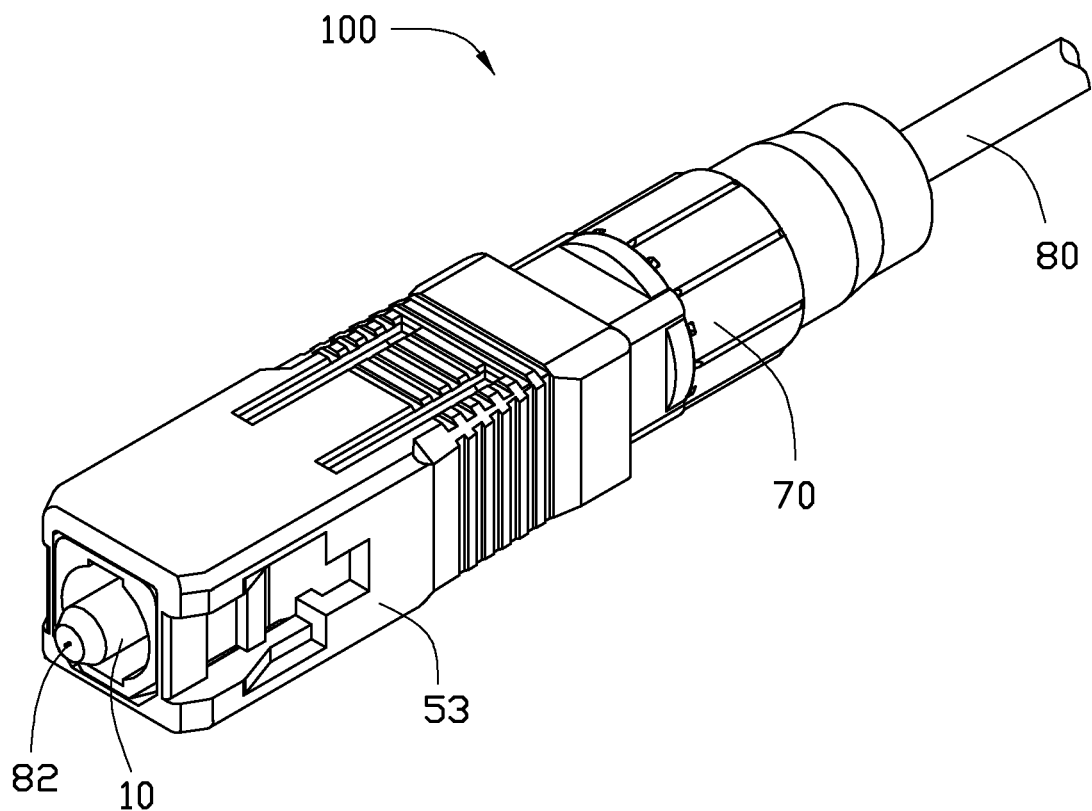
FIG. 1 is an isometric, assembled view of an embodiment of an optical fiber connector.
Figure 2:
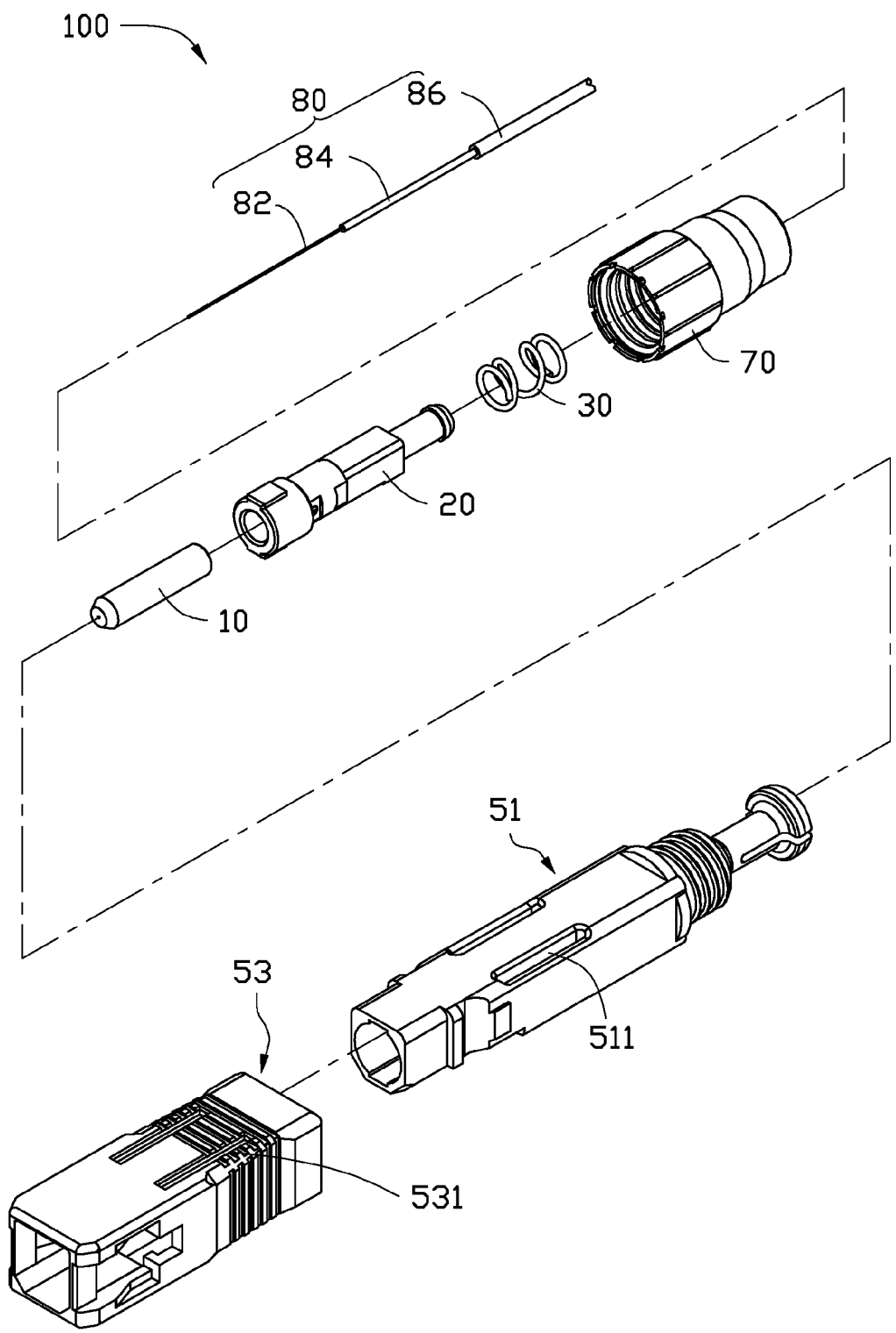
FIG. 2 is an exploded, isometric view of the optical fiber connector of FIG. 1 including a fixing module.

FIGS. 1 and 2 show an embodiment of an optical fiber connector 100. The optical fiber connector 100 includes an optical fiber ferrule 10, a fixing module 20, an elastic member 30, an inner housing 51, an outer housing 53, and a boot 70. The optical fiber ferrule 10 is positioned on one end of the fixing module 20. The elastic member 30 is sleeved on the other end of the fixing module 20 away from the optical fiber ferrule 10. The inner housing 51 is sleeved on the fixing module 20. The outer housing 53 is sleeved on the inner housing 51. The boot 70 is sleeved on an end of the inner housing 51 away from the outer housing 53. In an illustrated embodiment, the optical fiber connector 100 is a Subscriber Connector (SC) optical fiber connector. The optical fiber connector 100 grips a cable 80. The cable 80 includes an optical fiber 82, an inner coating 84 formed on the optical fiber 82, and an outer coating 86 formed on the inner coating 84. To facilitate the gripping of the cable 80 in the optical fiber connector 100, part of the outer coating 86 and the inner coating 84 are removed to expose the optical fiber 82.

The optical fiber ferrule 10 is substantially cylindrical, and is made of ceramic materials. The optical fiber ferrule 10 axially defines a through hole 102 (seen in FIG. 11) to receive the optical fiber 82. The optical fiber ferrule 10 further defines a guiding hole 104 (seen in FIG. 11) communicating with the through hole 102 in an end of the optical fiber ferrule 10 to facilitate the insertion of the optical fiber 82 into the through hole 102. In the illustrated embodiment, a diameter of the through hole 102 is slightly larger than a diameter of the optical fiber 82, to facilitate passing the optical fiber 82 through. The optical fiber 82 can be elastically bent in the through hole 102, when an end of the optical fiber 82 encounters resistance, which holds the optical fiber 82 in place. The guiding hole 104 can be substantially funnel shaped with a smaller end of the guiding hole 104 communicating with the through hole 102, which prevents the optical fiber 82 from breaking when being bent at a distal end of the through hole 102.

Figure 3:
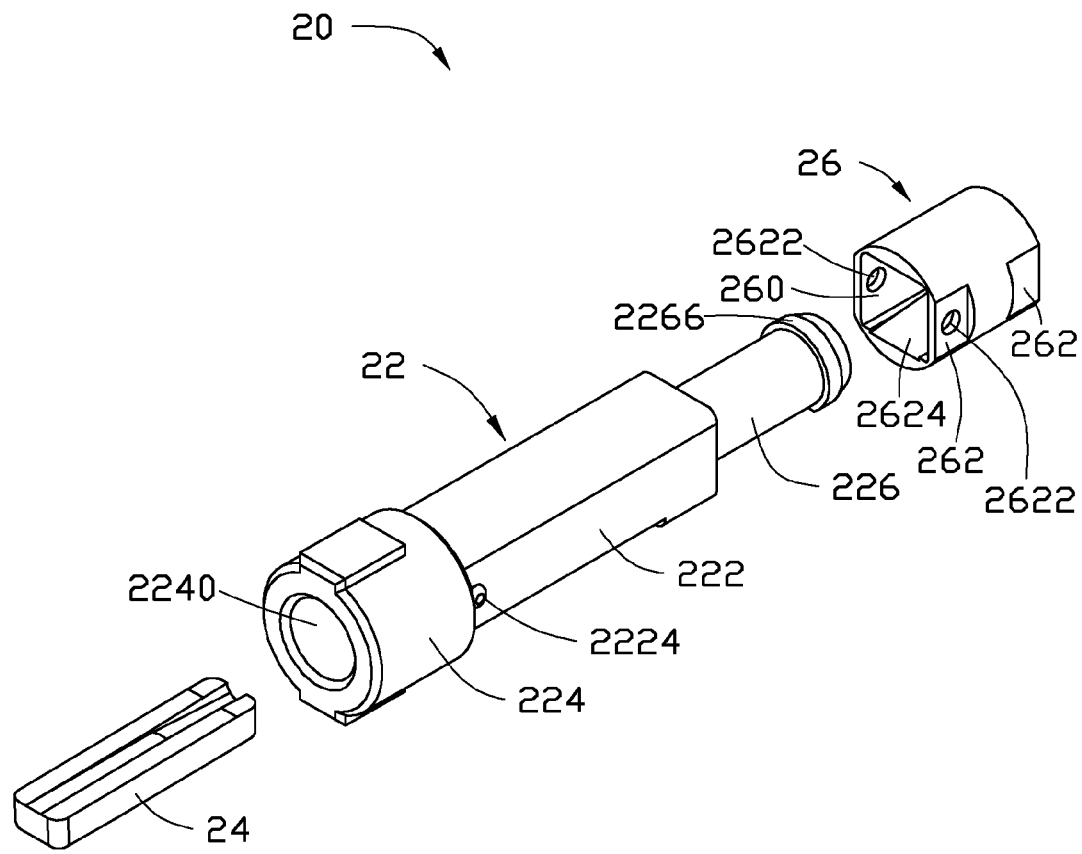
FIG. 3 is an exploded, isometric view of the fixing module of FIG. 2 including a fastening member.
Figure 4:
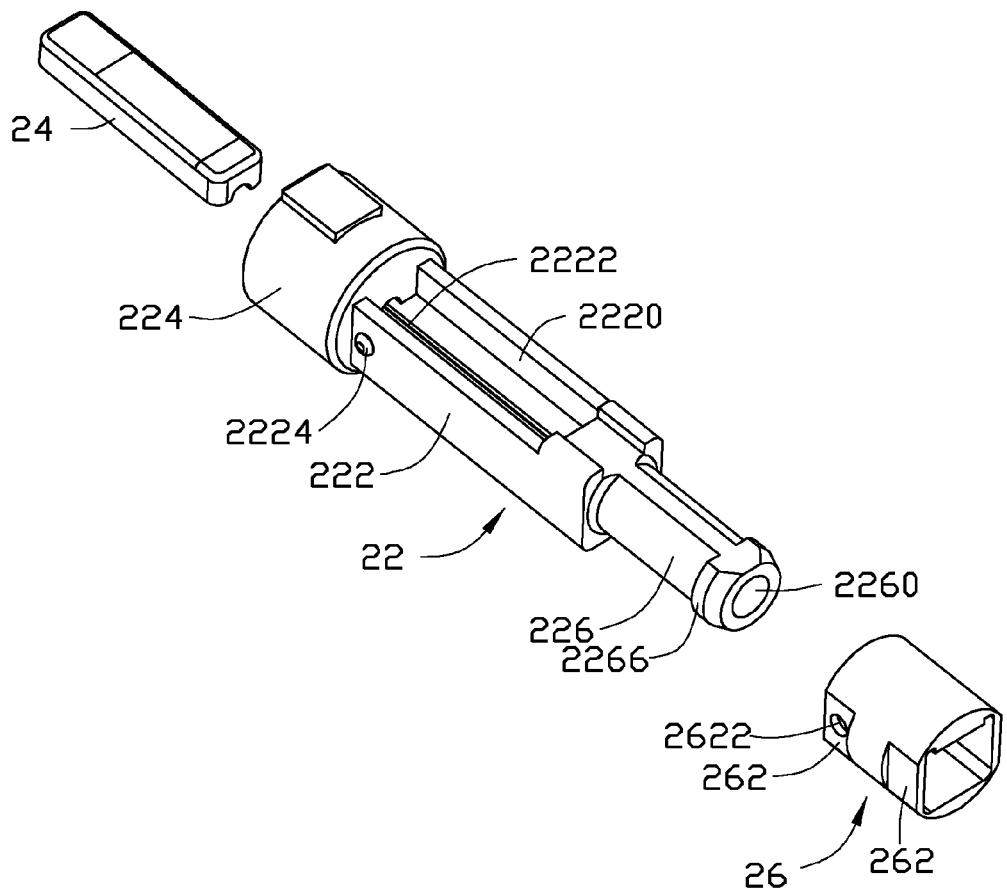
FIG. 4 is similar to FIG. 3, but viewed from another aspect.
Figure 5:
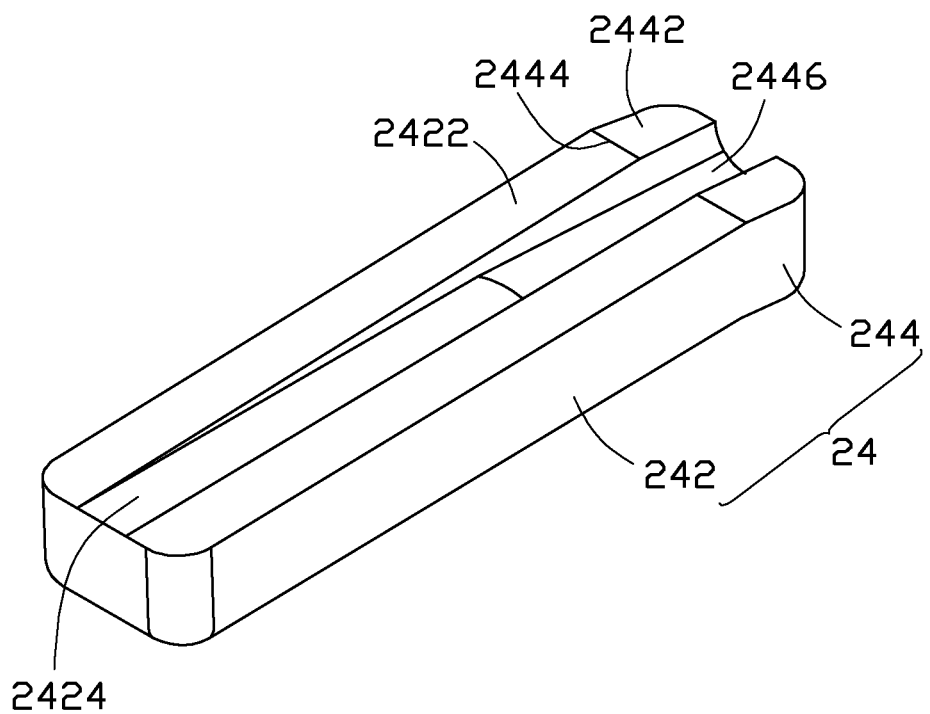
FIG. 5 is an enlarged, isometric view of the fastening member of FIG. 3.

FIGS. 3 to 5 show an embodiment of a fixing module 20. In the embodiment, the fixing module 20 is a sleeve. The fixing module 20 includes a support member 22, a fastening member 24 mating with the support member 22, and a locking member 26. The locking member 26 is sleeved on the support member 22 and the fastening member 24 to grip the optical fiber 82.

The support member 22 is substantially cylindrical. The support member 22 includes a fixing portion 222, a first assembling portion 224, and a second assembling portion 226. The first assembling portion 224 and the second assembling portion 226 extend outward from opposite ends of the fixing portion 222. The second assembling portion 226 forms a latching portion 2266 protruding from the outer surface of the assembling portion 226 adjacent to an end of the second assembling portion 226 away from the fixing portion 222.

Figure 6:
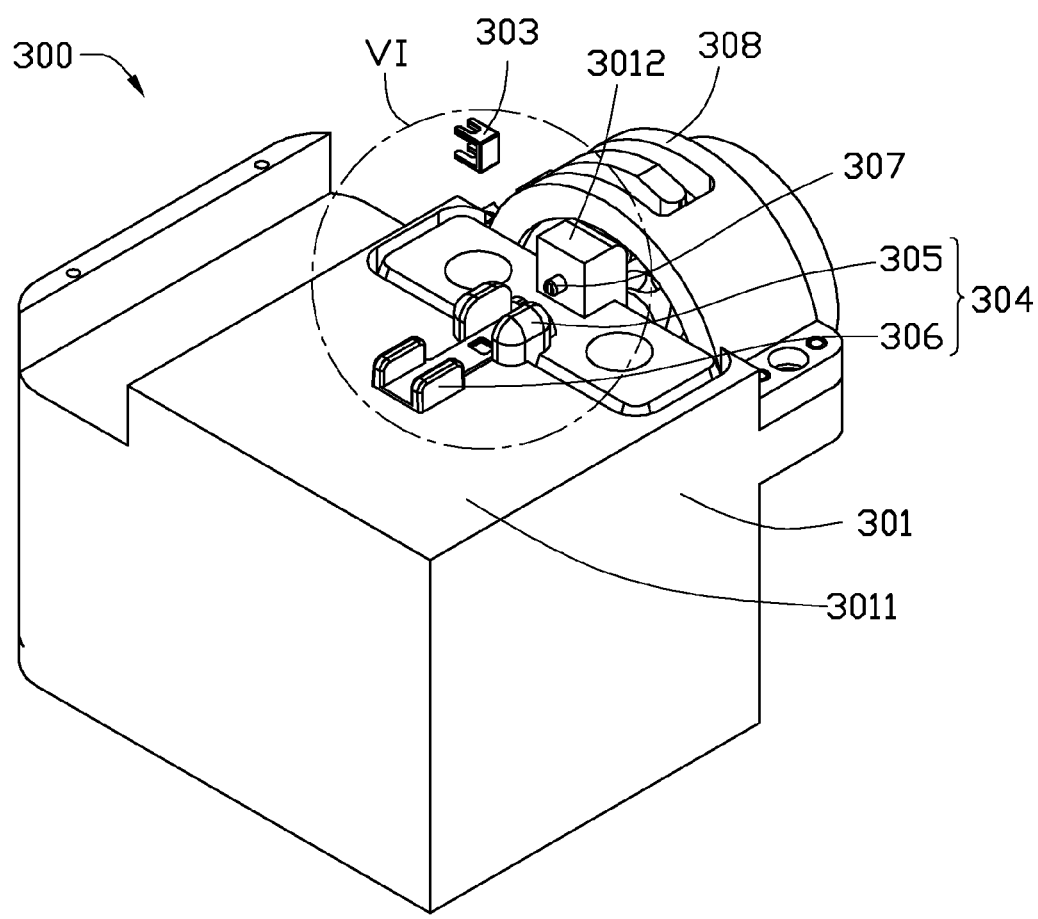
FIG. 6 is an isometric, assembled view of an embodiment of an assembly device including an assembly tool for assembling the optical fiber connector of FIG. 1.

In the illustrated embodiment, a cross section of the fixing portion 222 is rectangular, and the fixing portion 222 defines a receiving portion 2220 for receiving the fastening member 24. The fixing portion 222 further defines a first restricting groove 2222 in the bottom of the receiving portion 2220 extending in a direction substantially parallel to an optical axis of the optical fiber connector 100. The first restricting groove 2222 is a V-shaped groove. The first restricting groove 2222 can also be a U-shaped groove. The fixing portion 222 forms a pair of protrusions 2224 protruding from opposite sides of the fixing portion 222 adjacent to the first assembling portion 224. The protrusions 2224 are located at opposite sides of the receiving portion 2220. The first assembling portion 224 axially defines an assembling hole 2240 communicating with the first restricting groove 2222. The second assembling portion 226 axially defines a receiving hole 2260 communicating with the first restricting groove 2222. Both a diameter of the assembling hole 2240 and a diameter of the receiving hole 2260 are larger than a width of the restricting groove 2222. Referring to FIG. 6, a guiding groove 2226 is defined in an inner surface of the first restricting groove 2222 adjacent to the assembling hole 2240. The receiving hole 2260 is stepped. The receiving hole 2260 includes a first guiding hole 2262 at an end thereof away from the first restricting groove 2222 and a second guiding hole 2264 adjacent to and communicating with the first restricting groove 2222. A diameter of the second guiding hole 2264 is less than a diameter of the first guiding hole 2262.

The fastening member 24 is received in the receiving portion 2220 of the supporting member 22, and mates with the supporting member 22 so as to fasten the optical fiber 82 of the cable 80. The fastening member 24 includes a first resisting portion 242 and a second resisting portion 244 slantingly connected with the first resisting portion 242. The first resisting portion 242 includes a first resisting surface 2422 facing the bottom of the receiving portion 2220. The second resisting portion 244 includes a second resisting surface 2442 facing the bottom of the receiving portion 2220. When the locking member 26 slides along the fixing portion 222, the first resisting surface 2422 and the second resisting surface 2442 resists the bottom of the receiving portion 2220 in turn. The first resisting surface 2422 defines a second restricting groove 2424 corresponding to the first restricting groove 2222. The second resisting surface 2442 defines a guiding groove 2446 communicating with the second restricting groove 2424. The bottom of the guiding groove 2446 is a slanted surface, the guiding groove 2446 is deeper than the second restricting groove 2424, and the depth of the guiding groove 2446 gradually increases from the end adjacent to the second restricting groove 2424 to the other end. In the illustrated embodiment, the first resisting surface 2422 and the second resisting surface 2442 are both flat surfaces intersecting at an adjoining line 2444. In alternative embodiments, the surface between the first resisting surface 2422 and the second resisting surface 2442 can have a smooth curve.

In an alternative embodiment, the second resisting surface 2424 can be omitted, and the optical fiber 82 can be fixed in the fixing module 20 by means of the first resisting surface 2422 resisting the optical fiber 82.

In an alternative embodiment, the guiding groove 2446 can be formed at an end of the receiving portion 2220 adjacent to the second resisting surface 2442.

The locking member 26 is substantially a sleeve. The locking member 26 axially defines a through hole 260 mating with a cross section of the fixing portion 222 of the support member 22. The locking member 26 forms two pairs of gripping portions 262 at outer surfaces of the locking member 26. One pair of the gripping portions 262 defines a pair of locking holes 2622 corresponding to the pair of protrusions 2224. A slanted surface 2624 is formed at an inner surface of the locking member 26 adjacent to an end of the locking member 26, the slanted surface 2624 is formed between the pair of locking holes 2622, and a diameter of the through hole 260 adjacent to the second assembling portion 226 is larger than a diameter of the through hole 260 away from the second assembling portion 226. In alternative embodiments, the number of the gripping portions 262 can be one pair.

The elastic member 30 is a compression spring sleeved on the second assembling portion 226 in the embodiment. The inner housing 51 defines a pair of sliding grooves 511 in a sidewall thereof extending in a direction substantially parallel to the optical axis of the optical fiber connector 100. The inner housing 51 has an external thread 44 at an end thereof. The inner housing 51 further forms a locking portion 515 (seen in FIG. 11) at an inner surface thereof corresponding to the latching portion 2266.

The outer housing 53 is shaped to facilitate the connection of the optical fiber connector 100 into an SC adapter (not shown) in the embodiment. In an alternative embodiment, the outer housing 53 can be shaped to facilitate the installation of the optical fiber connector 100 to other types of adapters. The outer housing 53 defines a pair of operating grooves 531 communicating with the pair of sliding grooves 511 of the inner housing 51. The boot 70 fastens on an end of the inner housing 51.

Figure 11:
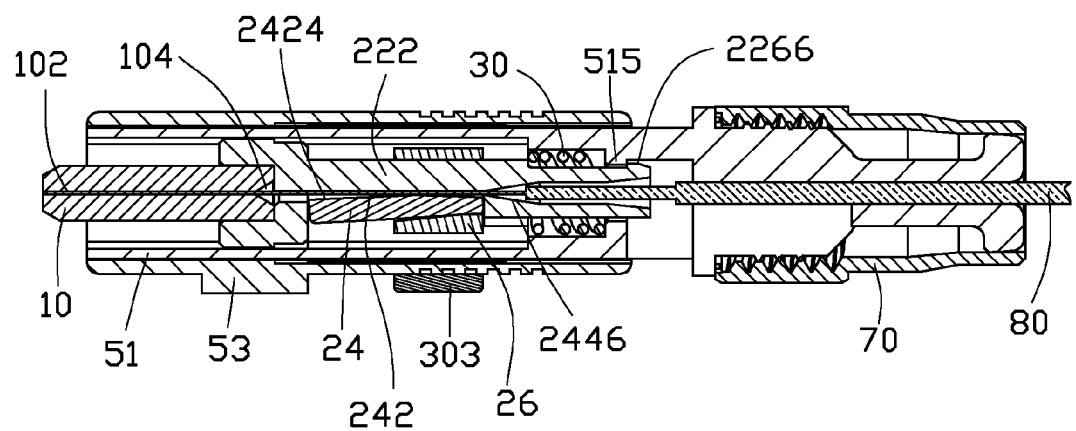
FIG. 11 is a cross-sectional view of the optical fiber connector of FIG. 9 taken along the line XII-XII, showing the fixing module at an ungripped state.

FIG. 11 shows that in assembly of the optical fiber connector 100, the fastening member 24 is received in the receiving portion 2220 of the support member 22. The locking member 26 is sleeved on an end of the support member 22 adjacent to the second assembling portion 226 (seen in FIG. 11). The optical fiber ferrule 10 is fastened in the assembling hole 2240 of the fixing module 20. The elastic member 30 is sleeved on the second assembling portion 226. The fixing module 20 is assembled in the inner housing 51 with the latching portion 2266 engaging with the locking portion 515. One end of the elastic member 30 resists the locking portion 515, and the other end of the elastic member 30 resists a distal end of the fixing portion 222. The outer housing 53 is sleeved on the inner housing 51 with the pair of operating grooves 531 communicating with the pair of sliding grooves 511. Finally, the boot 70 is fastened on a distal end of the inner housing 51 away from the outer housing 53.

Figure 7:
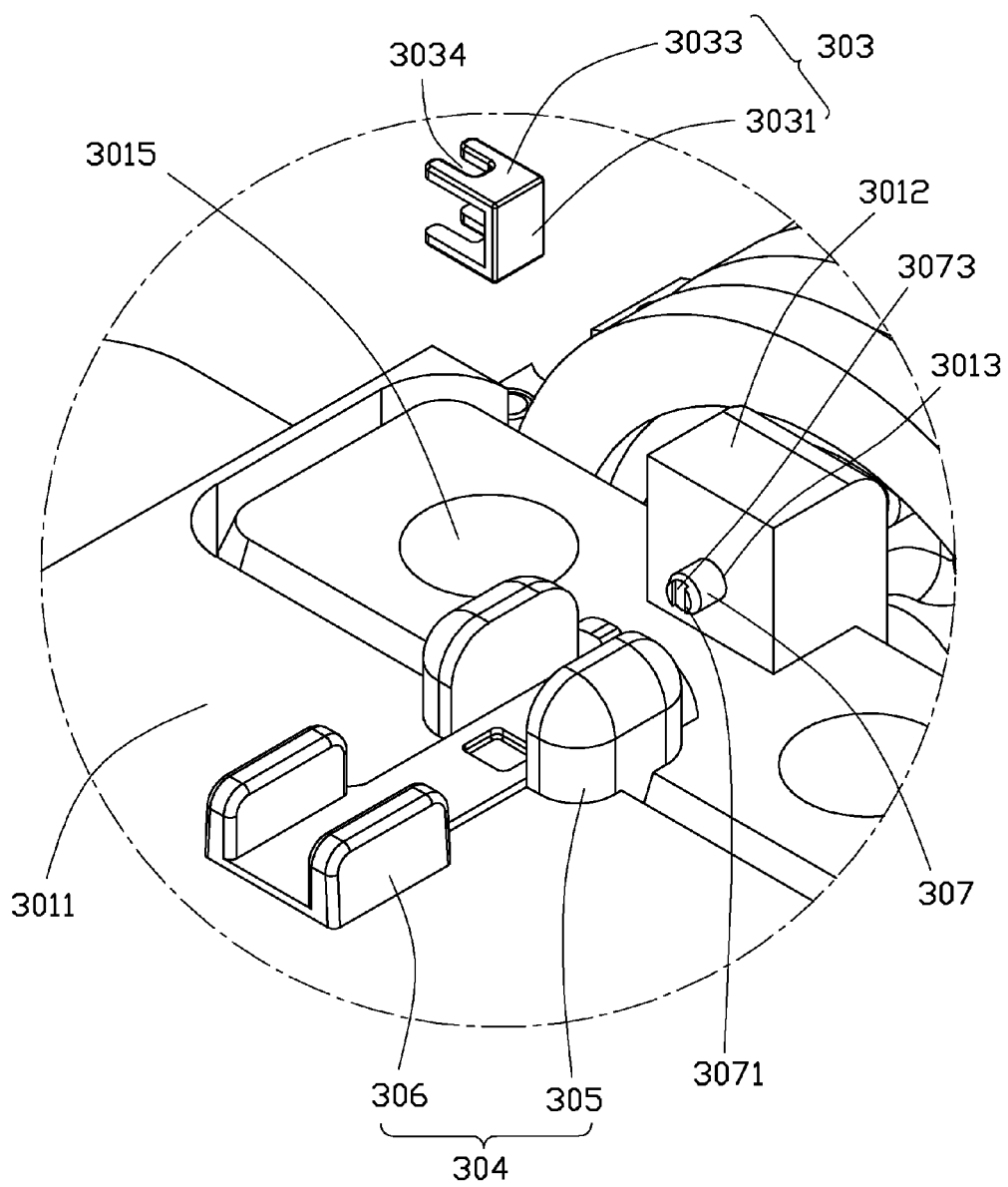
FIG. 7 is an enlarged view of a circled portion VI of FIG. 6.
Figure 8:
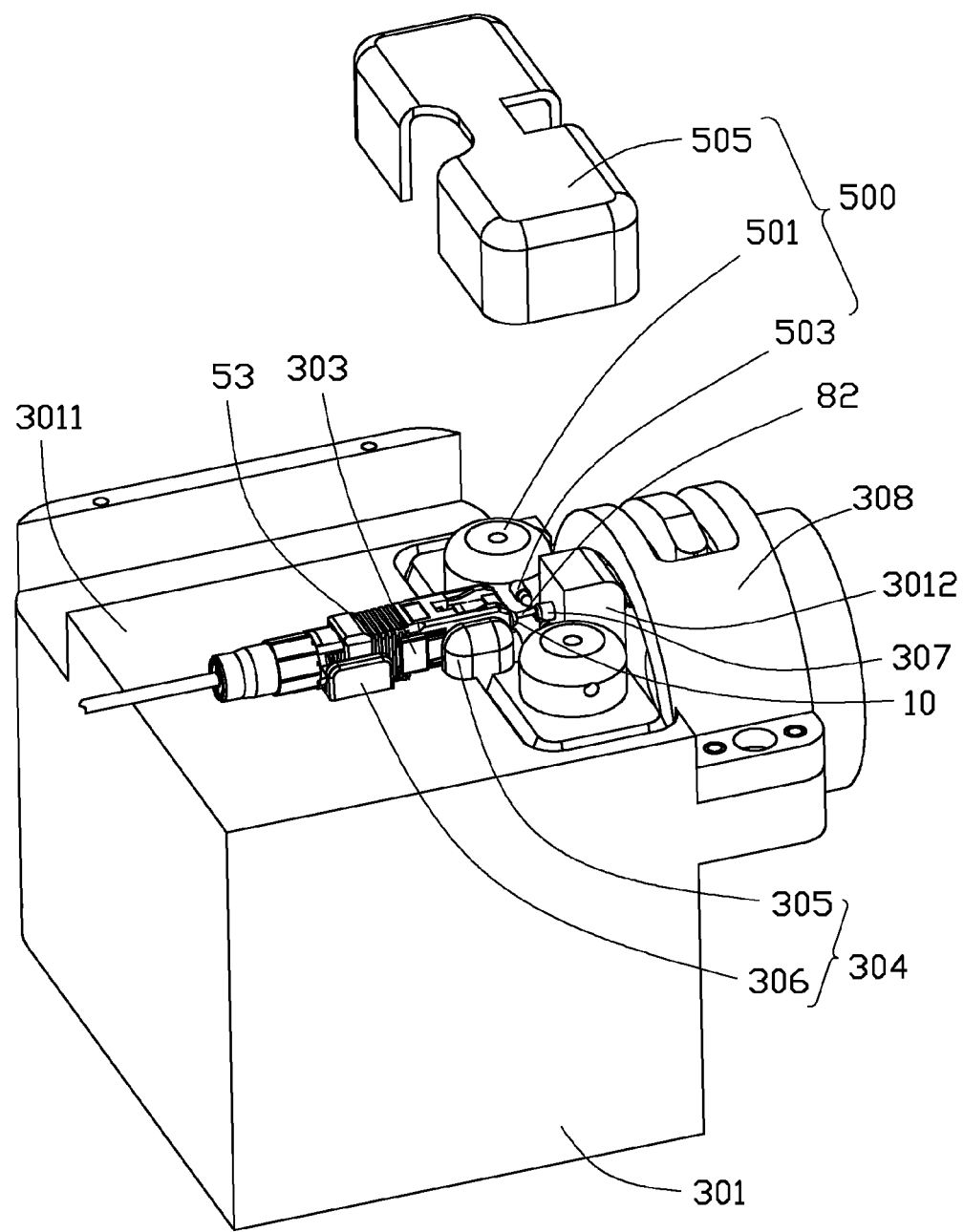
FIG. 8 is an isometric, assembled view of the assembly device of FIG. 6 in a first state, loading with a heating mechanism.
Figure 9:
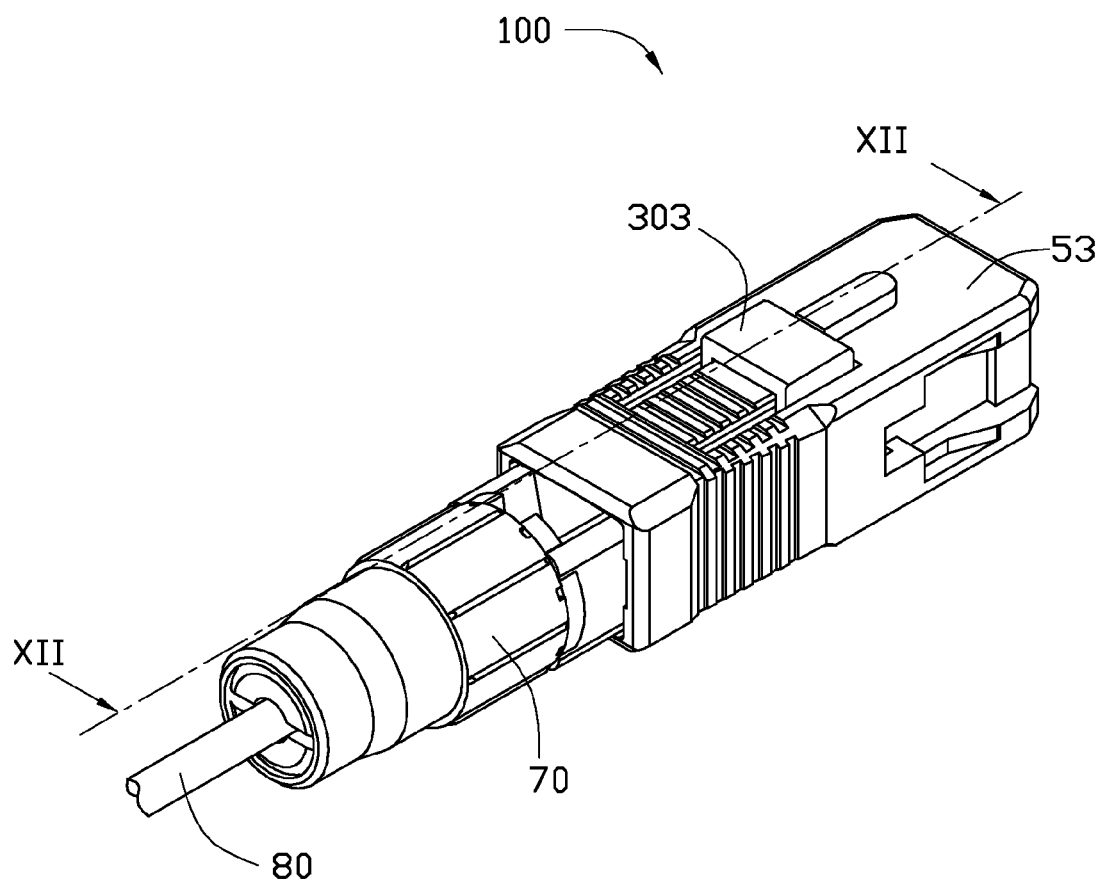
FIG. 9 is an assembled, isometric view of the optical fiber connector of FIG. 1 being clamped by the assembly tool of FIG. 6.
Figure 10:
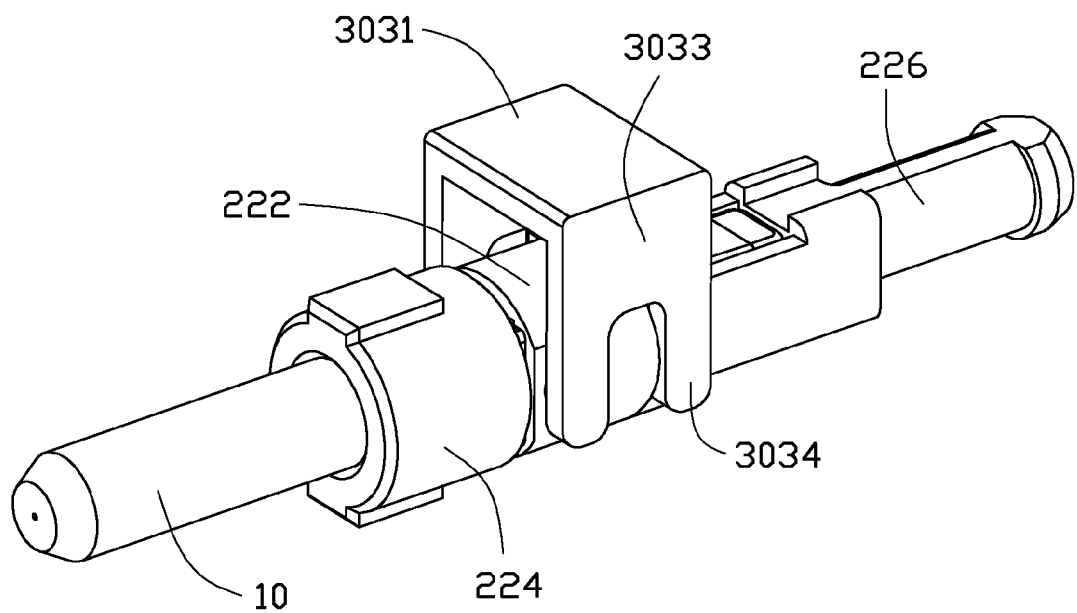
FIG. 10 is an isometric view of the fixing module of FIG. 2 being clamped by the assembly tool of FIG. 6.

FIGS. 6 to 8 show an embodiment of an assembly device 300 for assembling the optical fiber connector 100. The assembly device 300 includes a base seat 301, an assembling tool 303, a clamping assembly 304, a resisting member 307, an elastic member (not shown), and a driving member 308. The clamping assembly 304, the resisting member 307, the elastic member, and the driving member 308 are located on the base seat 301. The assembling tool 303 is applied to slide the fastening member 26 of the optical fiber connector 100. The clamping assembly 304 is applied to fix the optical fiber connector 100 on the base seat 301. The driving member 307 is applied to drive the resisting member 307 to move towards the optical fiber connector 100. The resisting member 307 is applied to elastically resist the optical fiber 82 via the elastic member.

The base seat 301 is substantially a block. The base seat 301 includes an assembly surface 3011 and an assembly portion 3012 protruding out of the assembly surface 3011. The assembly portion 3012 defines an assembly hole 3013 extending in a direction substantially parallel to the assembly surface 3011 for assembling the resisting member 307.

The assembling tool 303 is substantially U-shaped and includes a base portion 3031 and a pair of elastic arms 3033 extending substantially perpendicularly from opposite ends of the base portion 3031. Each of the pair of elastic arms 3033 includes a pair of elastic portions 3034.

The clamping assembly 304 includes a pair of clamping portions 305 and a pair of gripping portions 306 for clamping the optical fiber connector 100. The resisting member 307 is movably fixed in the assembly hole 3013 of the assembly portion 3012 and is protruding out of an end of the assembly portion 3012 adjacent to the clamping assembly 304. The resisting member 307 includes a resisting portion 3071 at an end adjacent to the clamping assembly 304. The resisting member 307 defines a receiving groove 3073 at a distal end of the resisting portion 3071. A depth of the receiving groove 3073 is controlled to be in a range from about 2 μm to about 4 μm. In the illustrated embodiment, the depth of the receiving groove 3073 is about 3 μm.

In the illustrated embodiment, the driving member 308 is a rotating member including a cam, and the driving member 308 is loaded at a sidewall of the base seat 301 adjacent to an end of the resisting member 307 away from the clamping assembly 304. The driving member 308 drives the resisting member 307 to move towards or away from the optical fiber ferrule 10 in a straight line parallel to the assembly surface 3011. In an alternative embodiment, the driving member 308 can be a screw rod.

The base seat 301 defines a pair of locating holes 3015 (seen in FIG. 7) for assembling a heating mechanism 500 to treat an end surface of the optical fiber 82. The heating mechanism 500 includes a pair of positioning portions 501, a pair of electrodes 503, a shielding cover 505, and a control unit (not shown). The pair of positioning portions 501 are positioned in the two locating holes 3015 respectively. The pair of electrodes 503 are located on the pair of positioning portions 501 respectively. The pair of electrodes 503 are positioned opposite to each other and adjacent to the resisting portion 3071 of the assembly device 300. The shielding cover 505 is covered on the pair of electrodes 503, and the control unit (not shown) is applied to control a discharge voltage or a discharge time of the pair of electrodes 503.

In assembling the cable 80 to the optical fiber connector 100, the optical fiber connector 100 is loaded on the assembly device 300 and is clamped by the pair of clamping portions 305 and the pair of gripping portions 306. The boot 70 is taken off from the inner housing 51; the optical fiber 82 of the cable 80 is inserted into the fixing module 20 from a distal end of the inner housing 51 away from the outer housing 53. In an initial state, as shown in FIG. 11, the locking member 26 is located at an end of the fixing portion 222 adjacent to the second assembling portion 226, the second resisting surface 2442 resists against the bottom of the receiving portion 2220, and the first resisting surface 2422 is distorted to form a gap (as seen in FIG. 11) between the first resisting surface 2422 and the bottom of the receiving portion 2220. The optical fiber 82 is inserted into the fixing module 20 with a length of the optical fiber 82 protruding out of the optical fiber ferrule 10 is controlled to be located between the pair of electrodes 503. At this time, as shown in FIG. 8, the assembly device 300 is in a first state. Turn on the heating mechanism 500, and a high pressure electric arc is generated between the two electrodes 503 under a discharge voltage to heat the end surface of the optical fiber 82 to an elevated temperature near the melting point of the fiber material. When all defects of the end surface of the optical fiber 82 have disappeared or have been smoothed, the heating is stopped. The end surface of the optical fiber 82 cools to reveal a smooth, rounded configuration.

Figure 12:
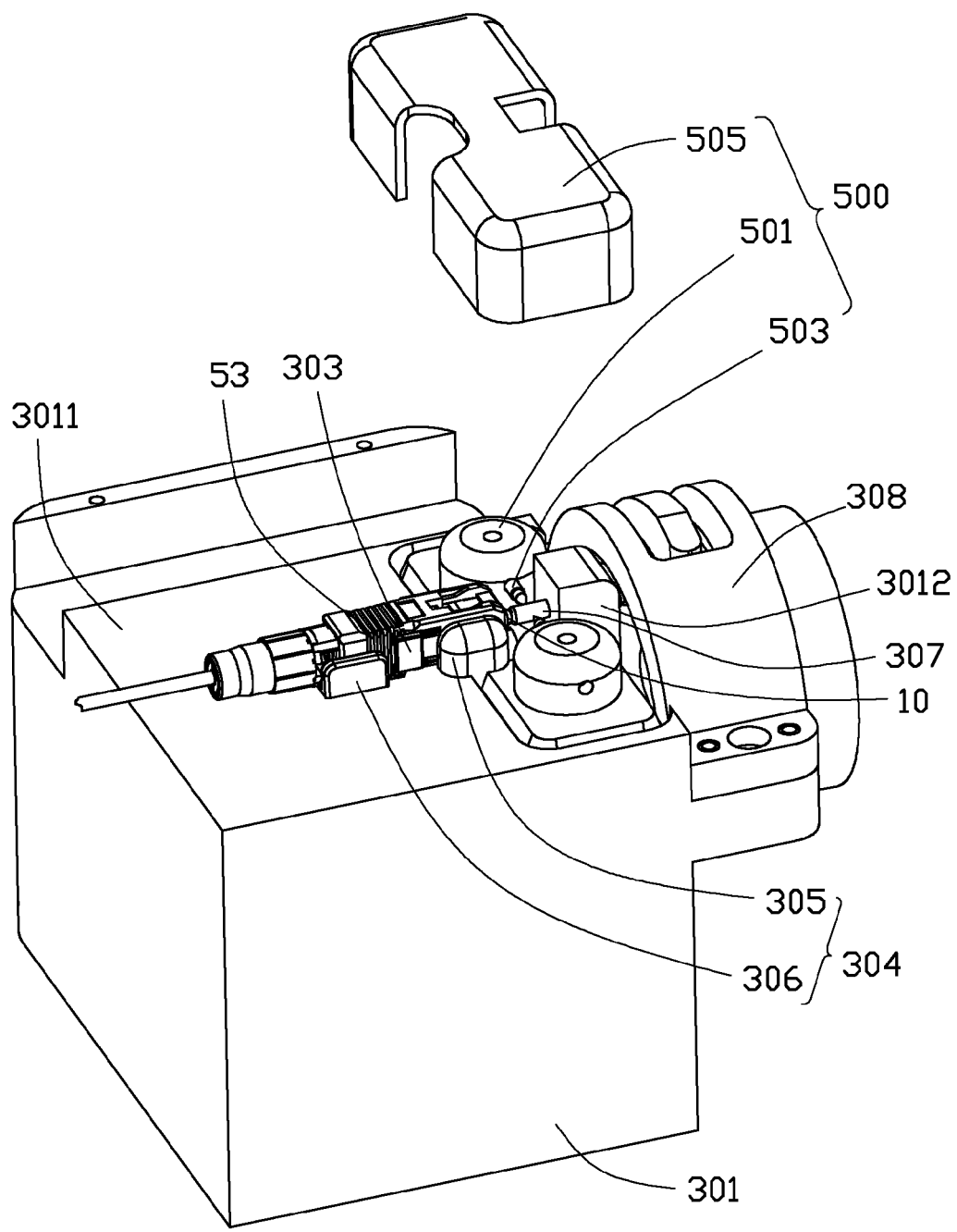
FIG. 12 is similar to FIG. 8, but showing assembly device of FIG. 6 in a second state.

The driving member 308 drives the resisting member 307 to move towards the optical fiber ferrule 10 until the resisting portion 3071 resists a distal end of the optical fiber ferrule 10. At this time, as shown if FIG. 12, the assembly device 300 is in a second state. The optical fiber 82 protruding out of the optical fiber ferrule 10 is received in the receiving groove 3073, and a length of the optical fiber 82 protruding out of the optical fiber ferrule 10 is substantially the same as the depth of the receiving groove 3073.

Figure 13:
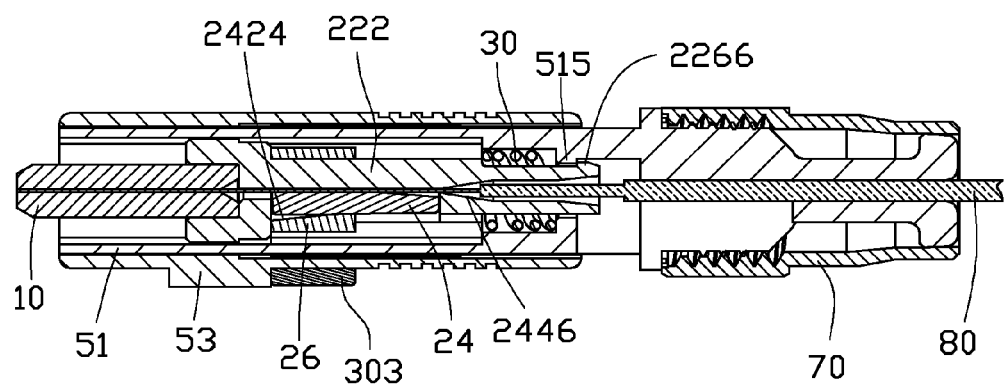
FIG. 13 is similar to FIG. 11, but showing the fixing module at a gripping state.

To slide the locking member 26, the pair of elastic arms 3033 of the assembling tool 303 are passed through the pair of operating grooves 531 and the pair of sliding grooves 511 successively, and the elastic arms 3033 latch with the two pairs of gripping portions 262. An operator slides the assembling tool 303 along the pair of operating grooves 531 to slide the locking member 26 towards an end of the fixing portion 222 adjacent to the first assembling portion 224 until the pair of locking holes 2622 engage with the pair of protrusions 2224. As shown in FIG. 13, the first resisting surface 2422 resists against the bottom of the receiving portion 2220 to fix the optical fiber 82 received in the first restricting groove 2222 in place. The boot 70 is fastened on a distal end of the inner housing 51 to fasten on and secure the outer coating 86 of the cable 80.

The pair of locking holes 2622 engaging with the pair of protrusions 2224 prevent the locking member 26 from sliding. In an alternative embodiment, the pair of locking holes 2622 and the pair of protrusions 2224 can be omitted.

When the optical fiber 82 needs to be removed from the optical fiber connector 100, the locking member 26 is slid via the assembling tool 303 to its initial state and the boot 70 taken off. The assembling tool 303 should be taken off the optical fiber connector 100 when the optical fiber connector 100 is in a state of use, but the locking member 26 cannot be slid along the fixing module 20 without the assembling tool 303, which prevents the optical connector 100 from being knocked off by accident, and ensure the optical fiber is firmly fixed in the fixing module 20.

The end surface of the optical fiber 82 is smoothed by the method, which increases the contact area between the optical fiber 82 and another optical fiber abutting the optical fiber 82. A length of the optical fiber 82 protruding out of the optical fiber ferrule 10 is controlled to be in a range from about 2 μm to about 4 μm. When the optical connector 100 is assembled on an adapter (not shown) to join with another optical fiber connector (not shown), the end surface of the optical fiber 82 of the optical fiber connector 100 resists the end surface of the optical fiber of the other optical fiber connector, and the optical fiber 82 will be bent, which puts the two end surfaces in continuous contact with each other. In addition, the end surface of the optical fiber 82 will be enlarged after the end surface of the optical fiber 82 has been treated, and the diameter of the end surface of the optical fiber 82 is nearly the same as the diameter of the through hole 102. Abutting on the end surface of the optical fiber of the other optical fiber connector, the end surface of the optical fiber 82 will be firmly received in the through hole 102 of the optical fiber ferrule 10.

The optical fiber connector 100 is firmly clamped by the pair of clamping portions 305 and the pair of gripping portions 306. The assembly tool 303 slides the fastening member 26 of the fixing module 20 to lock or unlock the optical fiber 82. In addition, the resisting member 307 is capable of controlling a length of the optical fiber 82 protruding out of the optical fiber ferrule 10. It is convenient to assemble the cable 80 to the optical fiber connector 100 or disassemble the cable 80 from the optical fiber connector 100.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. An optical fiber connector, comprising:
    a fixing module for gripping an optical fiber, the fixing module comprising a support member, a fastening member mating with the support member, and a locking member sleeved on the support member;
    an inner housing sleeved on the fixing module; and
    an outer housing sleeved on the inner housing, wherein the locking member forms at least one pair of gripping portions at outer surfaces of the locking member, the inner housing defines a pair of sliding grooves in a side wall thereof, the outer housing defines a pair of operating grooves communicating with the pair of sliding grooves correspondingly, and the locking member is capable of sliding along the support member to grip or unlock the optical fiber driven by an assembly tool engaging with the at least one pair of gripping portions through the pair of sliding grooves and the pair of operating grooves.

2. The optical fiber connector of claim 1, wherein the support member comprises a fixing portion, and a first assembling portion and a second assembling portion extending from opposite ends of the fixing portion, the fixing portion defines a receiving portion, the fastening member comprises a first resisting portion and a second resisting portion slantingly connected with the first resisting portion, the first resisting portion comprises a first resisting surface facing the bottom of the receiving portion, the second resisting portion comprises a second resisting surface facing the bottom of the receiving portion, the fastening member is received in the receiving portion, the locking member is sleeved on the fixing portion, and the first resisting surface and the second resisting surface resists the bottom of the receiving portion in turn as the locking member slides along the fixing portion.

3. The optical fiber connector of claim 2, wherein the fixing portion defines a first restricting groove in the bottom of the receiving portion extending in a direction substantially parallel to an optical axis of the optical fiber connector, the first assembling portion axially defines an assembling hole communicating with the first restricting groove, the second assembling portion axially defines a receiving hole communicating with the first restricting groove, and both a diameter of the assembling hole and a diameter of the receiving hole are larger than a width of the restricting groove.

4. The optical fiber connector of claim 3, wherein the first resisting surface defines a second restricting groove corresponding to the first restricting groove, the second resisting surface defines a guiding groove communicating with the second restricting groove, the bottom of the guiding groove is a slanted surface, the guiding groove is deeper than the second restricting groove, and a depth of the guiding groove is gradually deeper from one end of the guiding groove adjacent to the second restricting groove to the other end of the guiding groove away from the second restricting groove.

5. The optical fiber connector of claim 2, wherein the locking member axially defines a through hole mating with the cross section of the fixing portion of the support member.

6. The optical fiber connector of claim 1, wherein the locking member forms two pairs of gripping portions at the outer surface of the locking member.

7. The optical fiber connector of claim 6, wherein the fixing portion forms a pair of protrusions protruding out from opposite sides of the fixing portion adjacent to the first assembling portion, and the pair of the gripping portions adjacent to the first assembling portion define a pair of locking holes for engaging with the pair of protrusions.

8. The optical fiber connector of claim 7, wherein the locking member further comprises a slanted surface formed at an inner surface of the locking member adjacent to an end of the locking member, the slanted surface is located between the pair of locking holes, and a diameter of the through hole adjacent to the second assembling portion is larger than a diameter of the through hole away from the second assembling portion.

* * * * *